(12) United States Patent
Moore

(10) Patent No.: US 8,098,239 B1
(45) Date of Patent: Jan. 17, 2012

(54) SYSTEMS AND METHODS FOR POSITIONAL NUMBER ENTRY

(75) Inventor: Stephanie L. Moore, McKinney, TX (US)

(73) Assignee: Intuit Inc., Mountain View, CA (US)

( * ) Notice: Subject to any disclaimer, the term of this patent is extended or adjusted under 35 U.S.C. 154(b) by 966 days.

(21) Appl. No.: 12/056,077

(22) Filed: Mar. 26, 2008

(51) Int. Cl.
*G06F 3/041* (2006.01)

(52) U.S. Cl. ........................ 345/173; 715/700

(58) Field of Classification Search .......... 345/156–183, 345/104; 715/700, 764, 773, 780, 865, 866; 178/18.01–18.09, 18.11, 19.01–19.06
See application file for complete search history.

(56) References Cited

U.S. PATENT DOCUMENTS

| | | | |
|---|---|---|---|
| 5,134,692 A | 7/1992 | Hiromori | |
| 6,081,256 A * | 6/2000 | Herget et al. | 345/159 |
| 6,784,873 B1 | 8/2004 | Boesen et al. | |
| 2007/0013662 A1 * | 1/2007 | Fauth | 345/168 |
| 2007/0109278 A1 * | 5/2007 | Moon | 345/175 |
| 2008/0113614 A1 | 5/2008 | Rosenblatt | |
| 2008/0122796 A1 * | 5/2008 | Jobs et al. | 345/173 |

OTHER PUBLICATIONS

Title: How to control and understand settings in the Format Cells dialog box in Excel Date: Aug. 13, 2007 Publisher: Microsoft Article ID: 264372 Revision: 5.0 URL: http://support.microsoft.com/kb/264372.*

"Apple Adds New iPhone and iPod touch Models", Press Release, accessed at http://www.apple.com/pr/library/2008/02/05iphoneipodtouch.html, Feb. 5, 2008, 2 pages.

* cited by examiner

*Primary Examiner* — Stephen Sherman
(74) *Attorney, Agent, or Firm* — Osha • Liang LLP

(57) ABSTRACT

In various embodiments, a number entry mechanism may include a motion sensitive input device that is operable to receive a user motion along two or more dimensions. The motion sensitive input device may include input devices such as touchpads, touchscreens, mouse, etc. that can receive directional input. The number entry mechanism may also include a memory medium with program instructions operable to receive the input motion and determine numerical inputs based on the received input motion. In some embodiments, the memory medium and program instructions may be resident on the motion sensitive input device or may be part of a separate device. In some embodiments, the magnitude of the motion in each of, for example, two dimensions may be used to determine one or more numerical inputs.

18 Claims, 14 Drawing Sheets

Home Phone Number: [        ] ─703a
Work Phone Number: [        ]

Social Security Number: [              ] ─703b

Yearly Income: [        ]

SYSTEMS AND METHODS FOR POSITIONAL NUMBER ENTRY

BACKGROUND

Many applications and everyday devices require number entry. For example, financial software, recordation software (e.g., for maintaining medical histories and industry logs), calculators, etc. may require a user to enter one or more numbers. Typical number entry may include entering numbers by pressing corresponding number keys on the top or sides of a standard keyboard. Thus, typical number entry may require several finger strokes to enter a series of numbers. Users may want a more convenient way to enter numbers that may require fewer finger strokes. Users may also want a different form of number entry.

SUMMARY

In various embodiments, a number entry mechanism may include a motion sensitive input device that is operable to receive a user motion along, for example, two dimensions. The motion sensitive input device may include an input device such as a touchpad, touchscreen, computer mouse, etc. that can receive directional input from a user. The number entry mechanism may also include a memory medium and program instructions operable to determine numerical inputs based on the received directional input. In some embodiments, the magnitude of the motion in each of, for example, two dimensions may be used to determine one or more numerical inputs. In some embodiments, the number entry mechanism may include a memory medium and program instructions resident on the motion sensitive input device or as part of a separate device.

In some embodiments, the received directional input may include motion in an X,Y direction and determining the one or more numerical inputs may include determining a Y position at one or more intervals of X motion (the Y position may indicate a number (e.g., between 0-9) and the X interval may indicate a numerical placement of the number). In some embodiments, the motion sensitive input device and/or a display device coupled to the motion sensitive input device may include a grid and/or labels along the grid indicating numerical value (e.g., along the Y direction) and/or labels indicating numerical placement (e.g., along the X direction). The grid and/or labels may guide user input. In some embodiments, the motion sensitive input device may include one or more protrusions to indicate one or more of a numerical placement or number.

In some embodiments, the two-dimensional motion may include a line drawn by a finger or stylus against the motion sensitive input device. The motion sensitive input device may also receive input from a user indicating one or more symbols (e.g., a received user tap on a bar in an X or Y direction). In some embodiments, the program instructions may be computer-executable to determine symbols (or other non-numerical inputs) automatically based on a type of input the user is currently entering. For example, the type of input may include a phone number and determining one or more non-numerical inputs may include determining the placement of a dash in the phone number.

BRIEF DESCRIPTION OF THE DRAWINGS

FIG. 7 illustrates a displayed input form for receiving inputs from a number entry mechanism, according to an embodiment.

Figure 1:
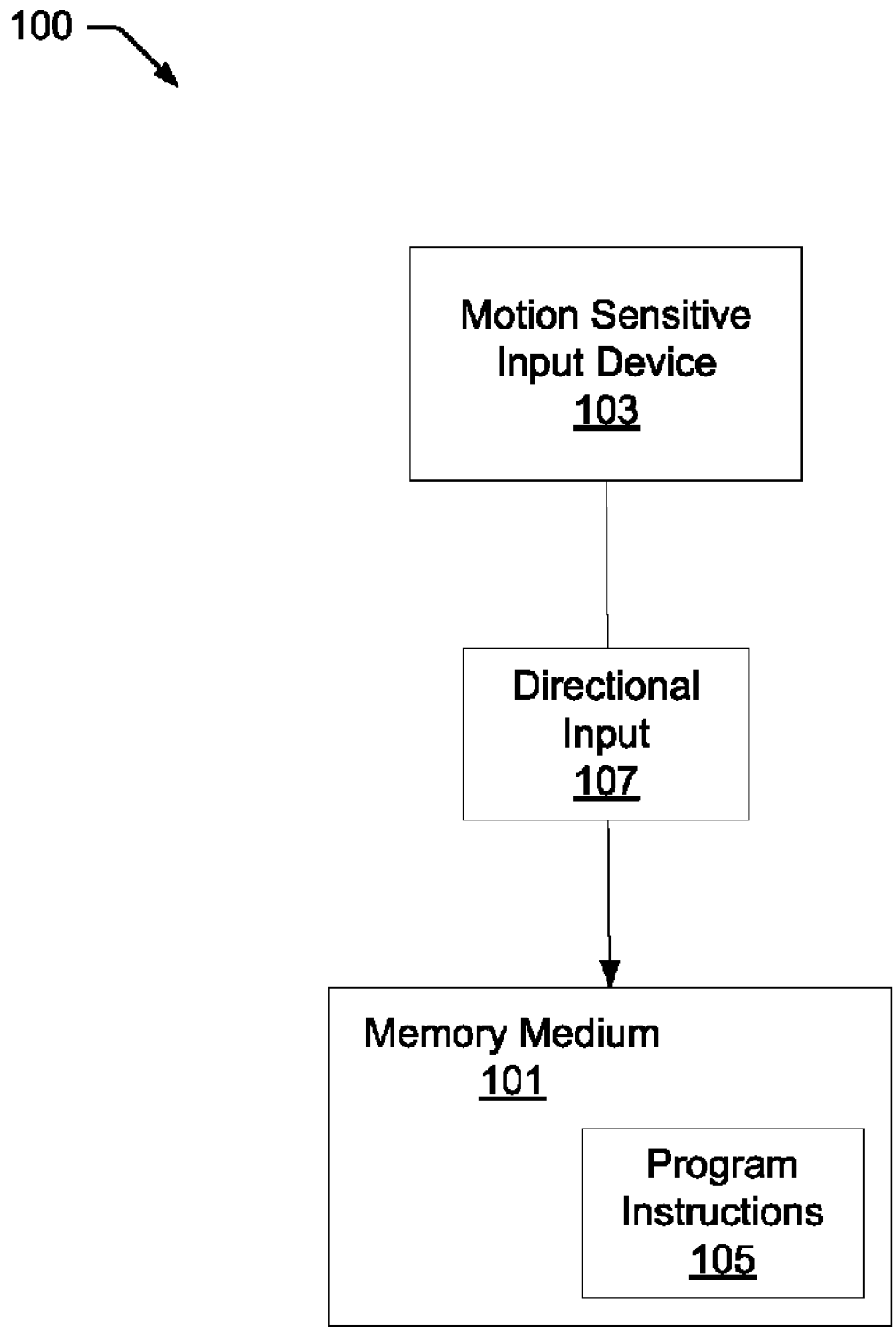
FIG. 1 illustrates a block diagram of a number entry mechanism, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF EMBODIMENTS

FIG. 1 illustrates a block diagram of a number entry mechanism 100, according to an embodiment. In some embodiments, a number entry mechanism 100 may include a motion sensitive input device 103 that is operable to receive directional input 107 in the form of detected user motion along, for example, two dimensions (e.g., X,Y). Other numbers of dimensions are also contemplated (e.g., three dimensional motion, one dimensional motion plus time, etc.). Motion sensitive input devices 103 may include, for example, a touchpad 207a,b, a touchscreen/display 221, etc. (e.g., see FIGS. 2a-c) that can receive directional input 107 from a user (e.g., from a user's finger or a stylus). Other motion sensitive input devices 103 are also contemplated. For example, a computer mouse 211, trackball, gloves (detecting motion of a user's hands or fingers), cameras (detecting motion of body part of a user such as a user's hand, a user's retina, etc.), a light pen 219 (detecting motion of the tip of the pen), etc. may be used as motion sensitive input devices 103.

The number entry mechanism 100 may also include a memory medium 101 with program instructions 105 operable to receive the directional input 107 and determine numerical inputs based on the received directional input 107. In some embodiments, the memory medium 101 and program instructions 105 may be resident on the motion sensitive input device 103 (e.g., integrated into a touchscreen phone 217) or may be part of a separate device (e.g., integrated into a computer system 200 coupled to the motion sensitive input device 103). In some embodiments, the program instructions 105 may be operable to determine one or more numerical inputs based on the magnitude of the motion in each of, for example, two dimensions. For example, the received directional input 107 may include motion in an X,Y direction and determining the numerical inputs may include determining a Y position at one or more intervals of X motion (the Y position may indicate a number (e.g., between 0-9) and the X interval may indicate a numerical placement of the number) (e.g., see FIGS. 3a-b). Other motions, directions, dimensions, and numerical input determinations are also contemplated.

Figure 2A:
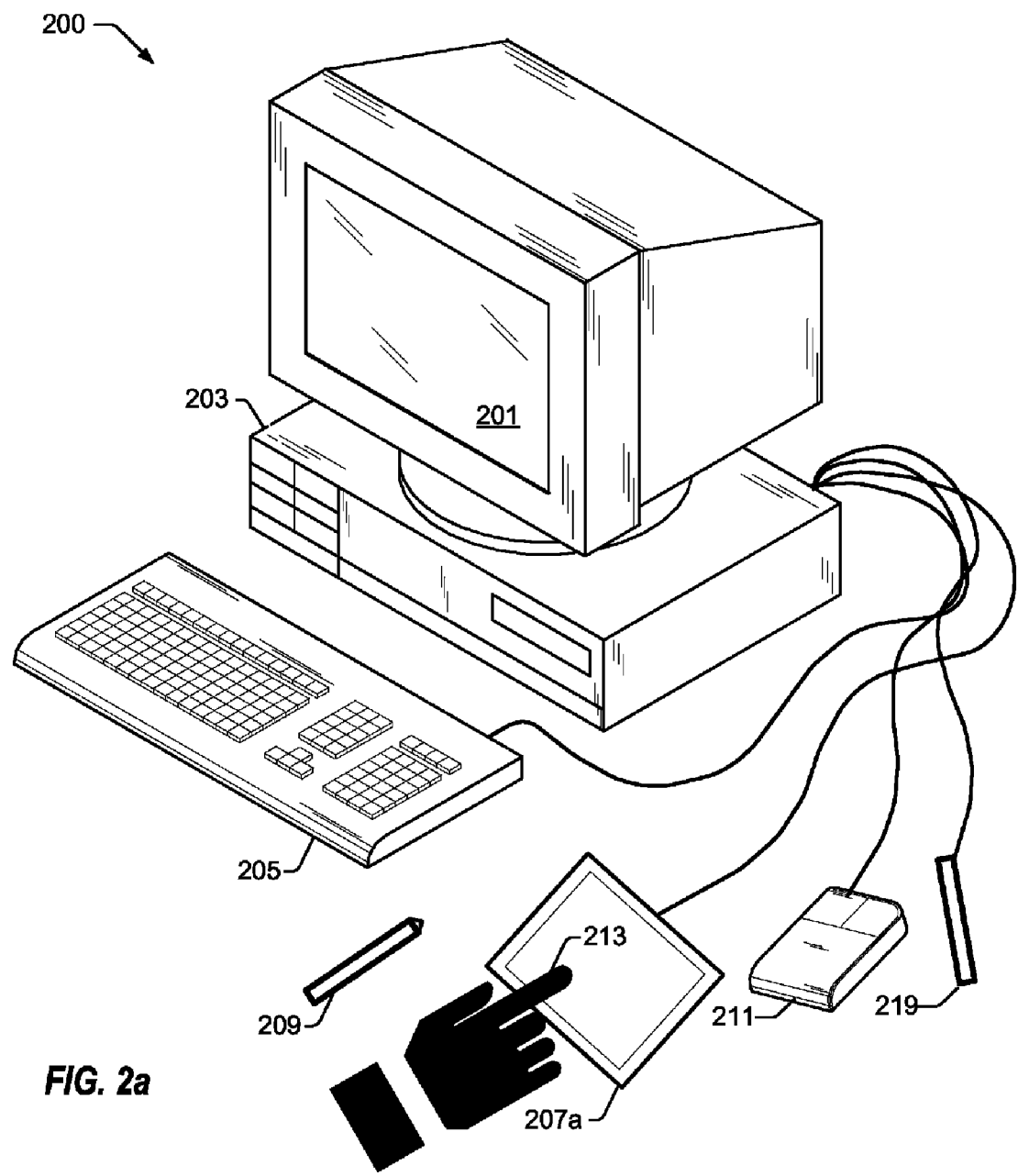
FIGS. 2a-c illustrate various embodiments of the number entry mechanism.
Figure 2B:
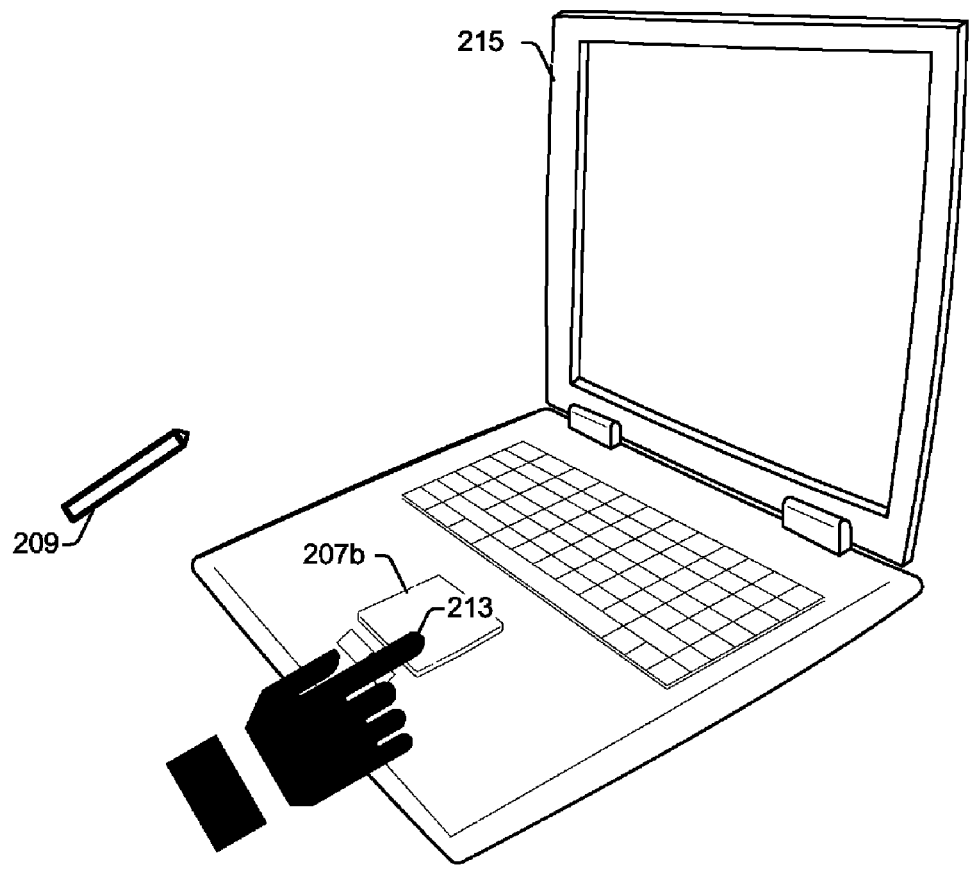
Figure 2C:
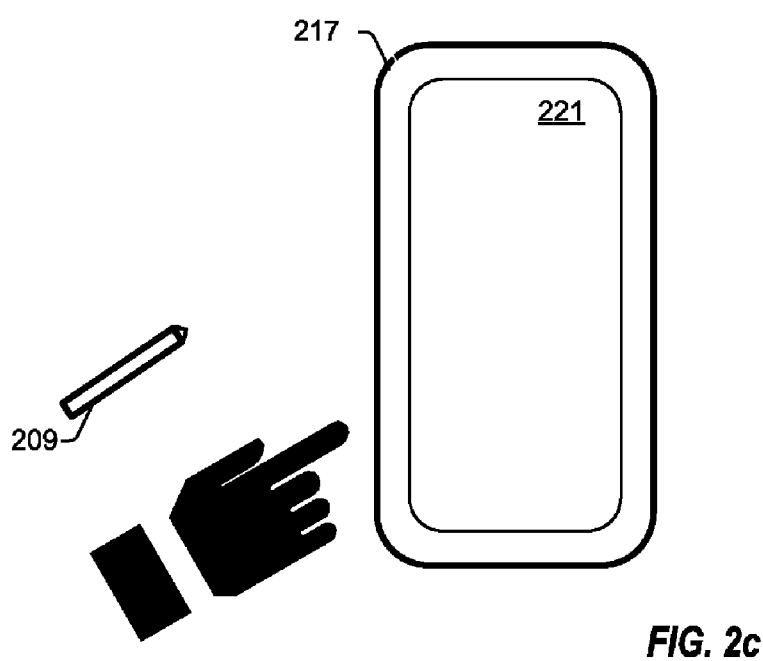

FIGS. 2a-c illustrate various embodiments of the number entry mechanism 100. FIG. 2a illustrates an embodiment of a number entry mechanism 100 that includes a motion sensitive input device 103 (e.g., the touchpad 207a, mouse 211, or light pen 219) and a computer system 200 that includes a processor unit 203 (which may include the memory medium 101 and program instructions 105). The computer system 200 may also include a display 201 and keyboard 205. Other components for the computer system 200 are also contemplated. In some embodiments, the touchpad 207a may be used in place of the keypad on the keyboard 205. Other placements are also contemplated. As seen in FIG. 2b, the motion sensitive input device 103 may include a laptop touchpad 207b receiving directional input 107 through movement of a finger 213 or stylus 209. In some embodiments, other motion sensitive input devices 103 may also be coupled to the laptop 215 (e.g., the touchpad 207a, mouse 211, or light pen 219). As seen in FIG. 2c, the motion sensitive input device 103 may include a touchscreen/display 221 (e.g., an integrated touchscreen and display) receiving directional input 107 through movement of a finger 213 or stylus 209 relative to the touchscreen/display 221. Other input devices are also contemplated.

Figure 3A:
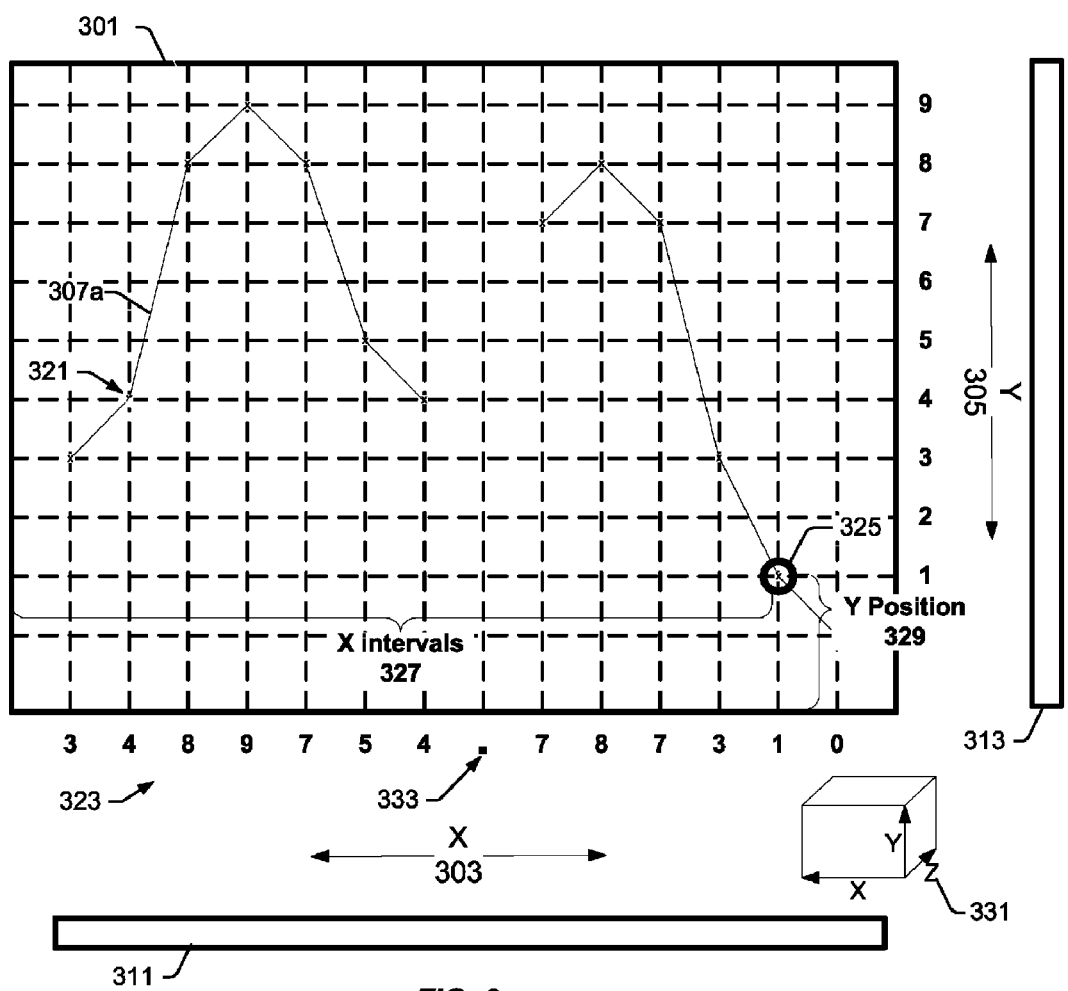
FIGS. 3a-b illustrates directional input received from the number entry mechanism, according to an embodiment.
Figure 3B:
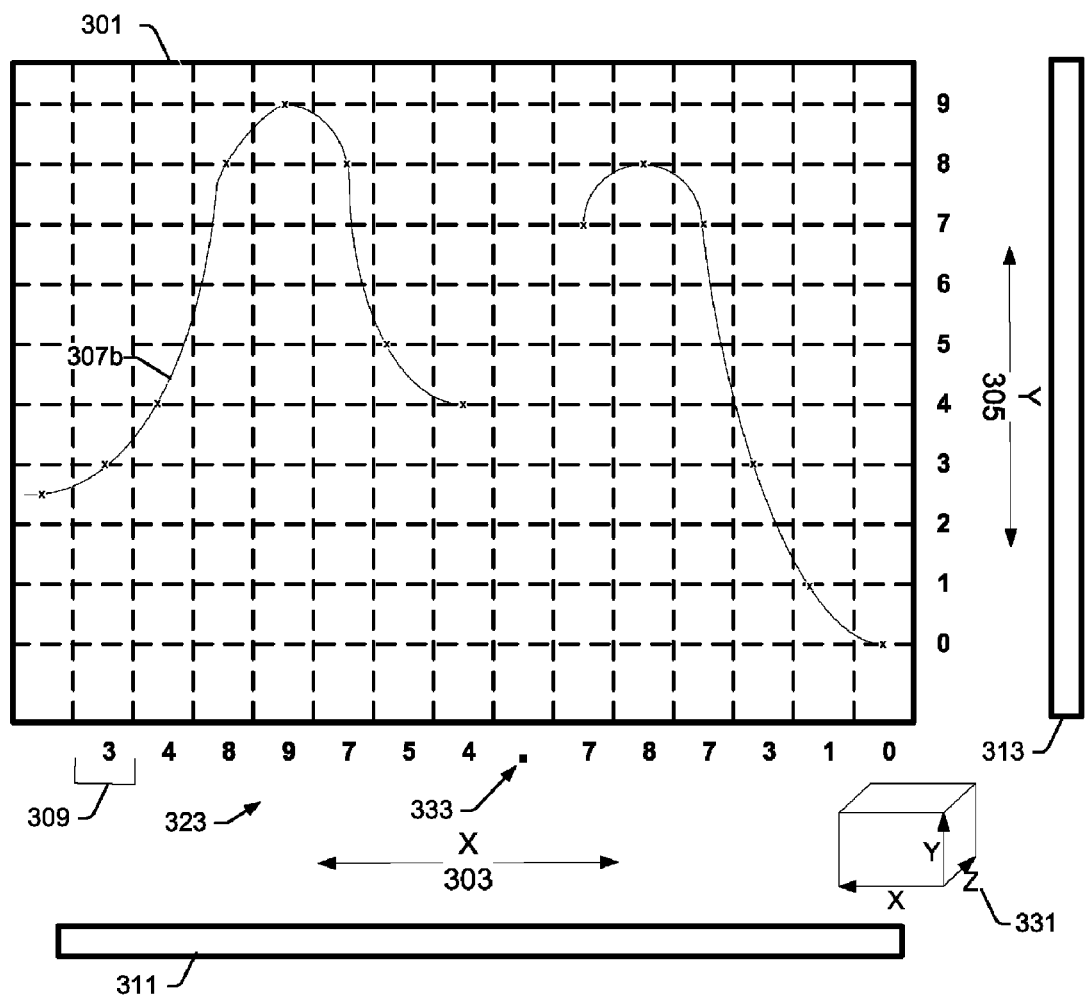

FIGS. 3a-b illustrate embodiments of directional input 107 received from the number entry mechanism 100. In some embodiments, directional input 107 may include motion along, for example, two dimensions (e.g., X direction 303 and Y direction 305).

In some embodiments, the directional input 107 may include user motion as indicated by lines 307a,b (see FIGS. 3a,b, respectively). In some embodiments, directional input 107 may include two components: (a) movement in the X direction 303 to designate the numerical placement (e.g., one's place, 10's place, 100's place, 1000's place, and decimals such as $10^{th}$ place, $100^{th}$ place, etc.) of the number and (b) movement in the Y direction 305 to designate the numerical value (e.g., 0-9) of the number. For example, the location of the directional input 107 (e.g., lines 307a,b) in the Y direction as the user crosses an X placement line (e.g., line 307a in FIG. 3a) or the mid point of an X direction zone (e.g., line 307b in FIG. 3b) may indicate the numerical value of the number for the corresponding X determined placement. As the input line 307a,b crosses the X placement line (e.g., as seen in FIG. 3a) or the mid point of an X direction zone (e.g., X direction zone 309 as seen in FIG. 3b), whichever Y direction line the input 307a,b is closest to (e.g., "3") may be chosen as the numerical value for the corresponding X determined placement. For example, number 325 may be at an X interval 327 (indicating 0.00001 placement due to the placement of the decimal) and Y position 329 (indicating a numerical value of "1"). Other X,Y locations for indicating a numerical placement/number are also contemplated.

In some embodiments, the numerical input 323 may be entered with one continuous user motion (e.g., one continuous line). In some embodiments, the user motion may be disjointed (e.g., stopping and starting). The user motion may be approximately straight (e.g., line 307a in FIG. 3a) between input points (e.g., see input point 321) or may be smooth/round (e.g., line 307b in FIG. 3b). Other input types are also contemplated. In some embodiments, X direction motion 303 may indicate a value of the number and Y direction motion 305 may indicate number placement. In some embodiments, Y direction motion 305 may indicate value of the number and Z direction motion 331 may indicate number placement (e.g., in a three dimensional X,Y,Z coordinate field). In some embodiments, Y direction motion 305 may indicate value of the number and time may indicate number placement (e.g., the user may move a finger 213 or stylus 209 up and down in the Y direction 305 (but not in the X or Z direction) and the numbers for the input may be generated in a series every 0.1 seconds). In some embodiments, X or Z direction motion may be used with time. Other directions and designations are also contemplated. In some embodiments, tracing a straight line in the Y direction 305 or continuing to press/trace the same number may result in the number repeating (e.g., 8888).

In some embodiments, a second user motion may be received to indicate a symbol 333. For example, a bar 311 or bar 313 may be pressed/tapped to indicate punctuation for the numerical input 323. For example, bar 311 may be pressed or tapped to indicate the placement of a decimal in the numerical input 323. Other symbols 333 may also be selected based on, for example, one-dimensional motions such as a bar press/tap (e.g., arithmetic symbols such as +, −, *, and /). Additional symbols 333 may include, for example, symbols 333 commonly found on the top of number keys on a standard keyboard (such as $, %, ^, etc.). Other symbols 333 are also contemplated (e.g., a comma). In some embodiments, the X bar 311 or Y bar 313 may be parts of a touchscreen or touchpad or may be separate buttons. Other symbol input configurations are also contemplated. For example, a circular, elliptical, triangular, etc. region may be used. In some embodiments, the user may press one or more keys on a keyboard for inputting symbols 333.

In some embodiments, the second user motion may include the user entering a symbol 333 by tracing out the symbol 333 using the motion sensitive input device 103. For example, the user may trace a curve on the touchpad 207a for a comma or tap the touchpad 207a for a decimal. In some embodiments, the user may trace the symbol 333 on a designated portion of the motion sensitive input device 103 or may trace the symbol 333 at the appropriate location on the grid 301 to indicate placement of the symbol 333. For example, the user may trace a curve at a location on the grid 301 between two numbers that need to be separated by a comma. Other traced symbols 333 are also contemplated. In some embodiments, the symbols 333 may be added by a user after entering the number. For example, in a calculation application, the user may enter two numbers in a continuous string of numbers and after the numbers are entered, may place a "+" sign between the two numbers to indicate addition. For example: 848290028948 to 8482900+28948.

In some embodiments, the symbols 333 may be automatically determined. For example, the type of number being entered may determine the type of symbol 333 used when the X bar 311 or Y bar 313 is used. In some embodiments, an input field receiving the numerical input 323 may be formatted according to a template that designates the appropriate symbols 333 and placement of the symbols 333. In some embodiments, the user may enter preferences for symbol types and placements within one or more input fields. Other symbol designations and placements are also contemplated.

Figure 4:
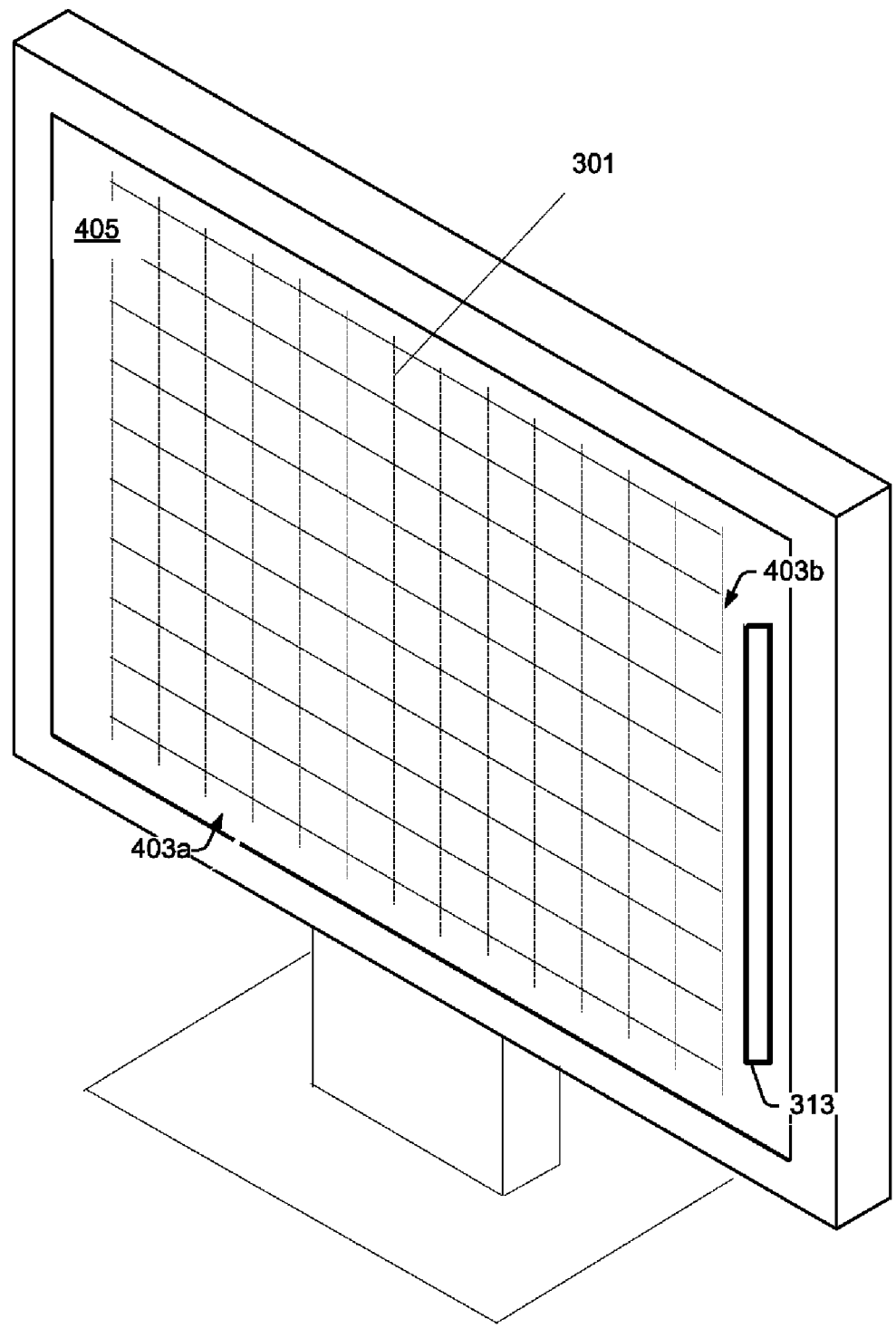
FIG. 4 illustrates a grid on a display for guiding user input, according to an embodiment.
Figure 5A:
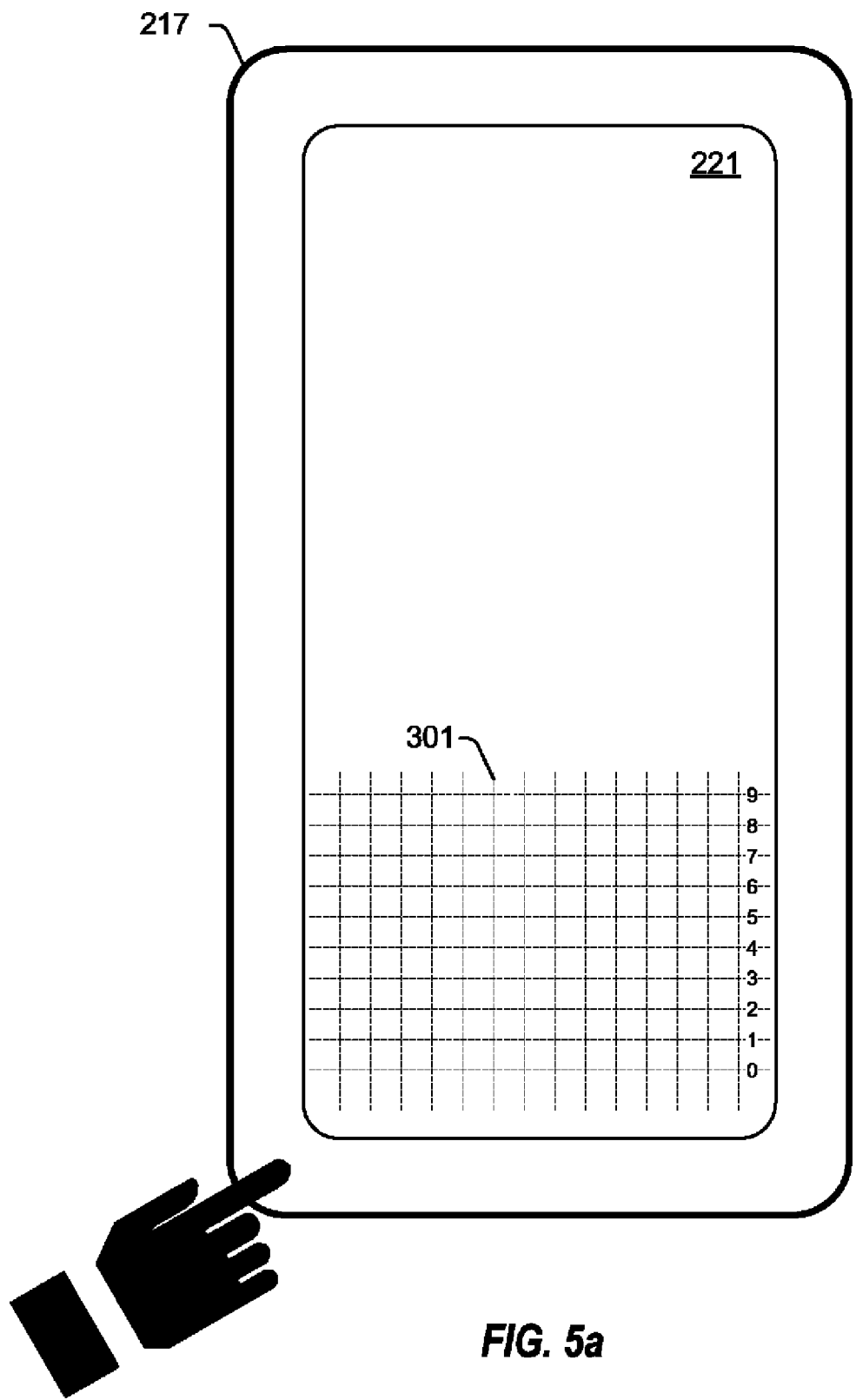
FIGS. 5a-c illustrate touchscreens with grids/zones, according to various embodiments.

FIG. 4 illustrates an embodiment of grid 301 on a display 405 for guiding user input. In some embodiments, the grid 301 may guide the user as the user enters the directional input 107. The grid 301 may include an axis 403a that indicates numerical placement and an axis 403b that indicates a number (e.g., between 0-9). The user may use the grid 301 to aim their directional input 107 (e.g., a drawn line) to the appropriate Y magnitudes at various X direction placements. For example, the grid 301 may be displayed on display 405 (e.g. a flat screen display or touchscreen display). As another example, as seen in FIG. 5a, the grid 301 may be displayed on a touchscreen/display 221 of a phone. One or more of the X bar 311 or Y bar 313 may also be displayed. In some embodiments, the grid 301 may be displayed on a display 405 and, for example, not on a motion sensitive input device 103 receiving the directional input 107. As the user inputs motion on the motion sensitive input device 103, a corresponding input line (e.g., line 307a,b) may be displayed on the display 405. In some embodiments, part of the grid may be displayed on the motion sensitive input device 103 and/or display 405. For example, either the horizontal lines or the vertical lines may be displayed. In some embodiments, a grid 301 may not be displayed. In some embodiments, other information may be displayed (e.g., a number magnitude guide on the right side of the screen) to guide a user's input.

Figure 5B:
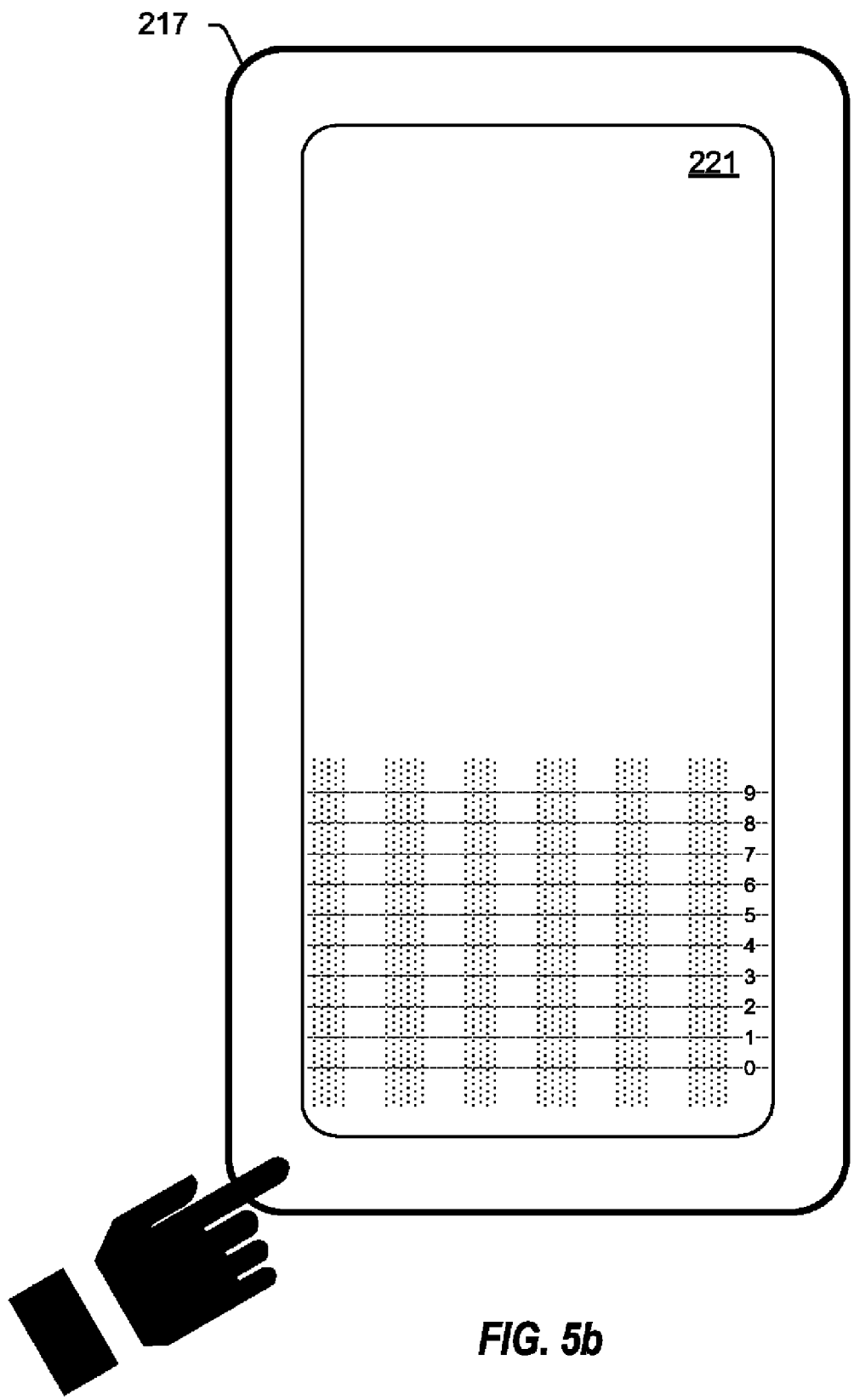
Figure 5C:
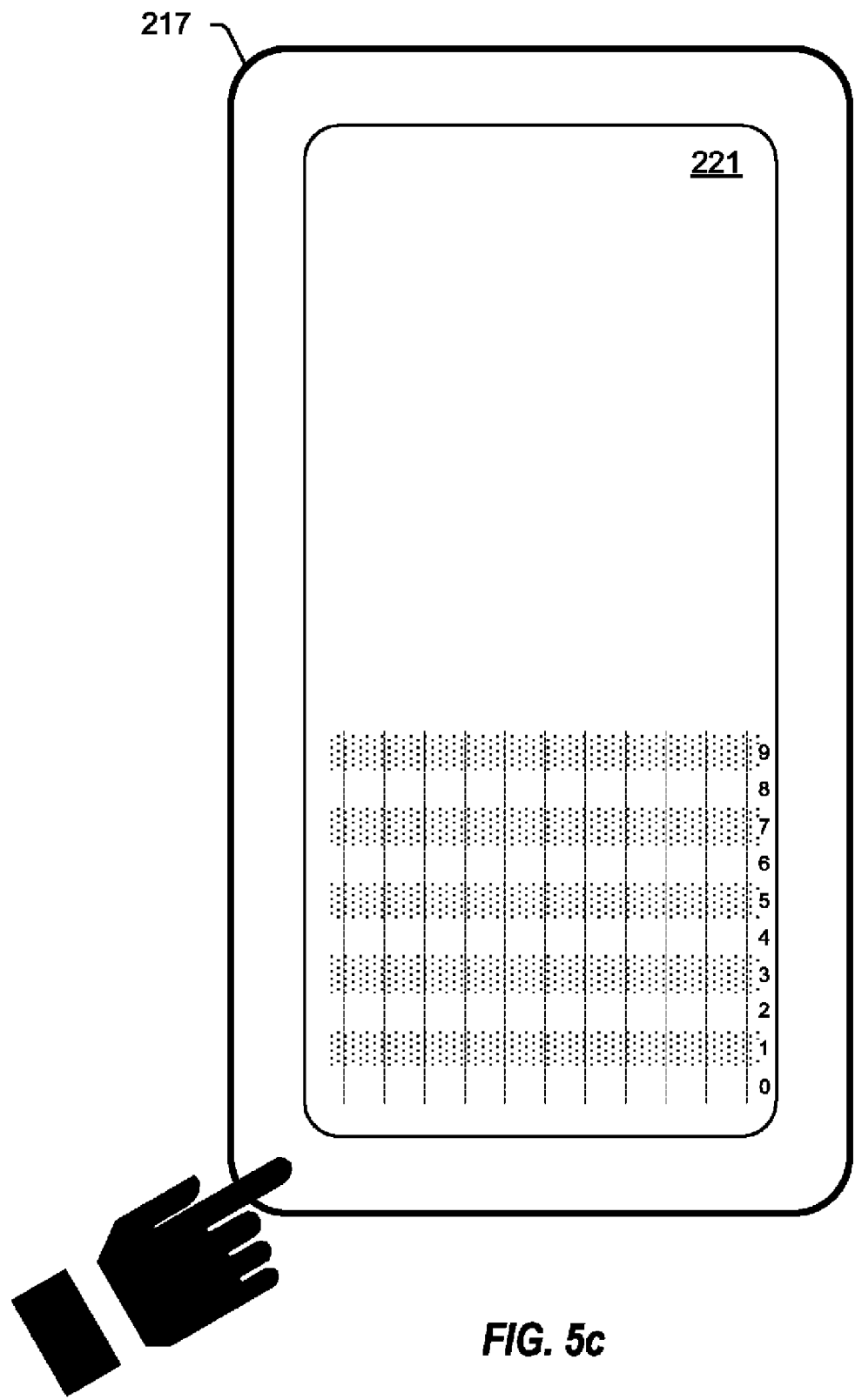

In some embodiments, the grid 301 may include horizontal and/or vertical zones (e.g., white/gray zones, colored zones, etc.) with various zones lining up with various number magnitudes and/or number placements. For example, as seen in FIGS. 5b-c, 11 vertical or horizontal zones may be displayed on the touchscreen/display 221 of the phone 217 (e.g., to guide user input of a phone number). Other numbers of zones and horizontal zones are also contemplated.

In some embodiments, numerical input 323 determined from the directional input 107 may be displayed as the user is entering the directional input 107 using the number entry mechanism 100. In some embodiments, the user may correct the directional input 107 corresponding to an entered number by reentering at least a portion of the directional input 107 (e.g., by using the motion sensitive input device 103 to input a correct location for the number on a column of the grid 301). The user may, for example, press on a touchpad 207a at a spot in a corresponding X direction zone to correct the number that previously had an incorrect number associated with that zone (e.g., zone 309 in FIG. 3b). For example, after entering the directional input 107, a user may notice the third number determined from the directional input 107 should be a 7 and not an 8 as indicated by the number entry mechanism 100. The user may then, for example, press on the zone of the grid 301 (at the X placement corresponding to the placement of the incorrect 8) on the correct Y line/zone corresponding to the 7. The 8 at that placement in the number may be changed to a 7 and the user may indicate acceptance of the number (e.g., by pressing enter). Other correction methods are also contemplated.

In some embodiments, the grid 301 may be displayed during a training mode. For example, the user may turn on/off the grid 301 to provide guidance while the user is becoming accustomed to entering numbers. With practice, the user may become more familiar with the motion sensitive input device 103 and may not require the grid 301 to be displayed while entering numbers.

In some embodiments, the number entry mechanism 100 may adapt one or more characteristics of the number entry mechanism to a particular user. For example, the number entry mechanism 100 may adjust the width of the X zone and/or distance between Y positions of a grid 301 according to the user's input. In some embodiments, during a learning mode, the number entry mechanism 100 may ask the user to enter a specific number and the number entry mechanism 100 may adapt the size of the X zone and the Y positions according to how the user enters the number. For example, the number entry mechanism 100 may ask the user to enter "9281", and the number entry mechanism 100 may adjust the width of the X zone of the grid 301 depending on where the user's input hits the Y positions corresponding to "9", "2", "8", and "1". Different users may require different grid configurations. For example, a user with larger fingers may use wider X intervals (which may require wider X zones). In some embodiments, the user may enter preferences for the grid configuration (e.g., a width of the X zones, distance between Y positions, length of the X zones, length of the Y zones, etc.). Other preferences are also contemplated.

Figure 6:
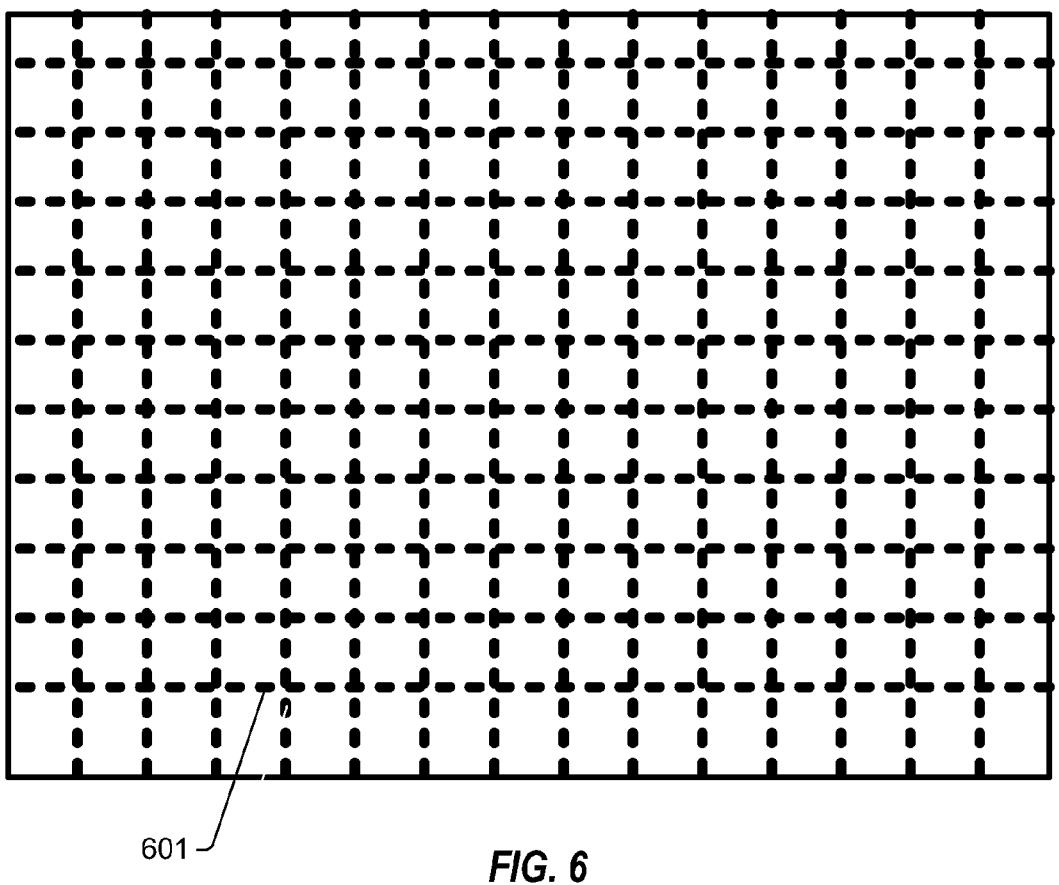
FIG. 6 illustrates a grid in the form of ridges to guide user inputs for the number entry mechanism, according to an embodiment.

FIG. 6 illustrates a grid 301 in the form of protrusions 601 to guide user inputs for the number entry mechanism 100, according to an embodiment. In some embodiments, the grid 301 made include protrusions 601 (e.g., ridges) to guide the user through the user's sense of touch. For example, the user may feel the protrusions 601 through their finger 213 as their finger 213 traces out the line of directional input 107. The protrusions 601 (in a similar fashion as Braille) may be used by a visually impaired user to guide the user's input. In some embodiments, the protrusions 601 may also guide a user entering directional input 107 without specifically looking at the grid 301 (e.g., a user who is looking at the display 405 instead of a touchpad 207a). For example, the user who has become accustomed to the number entry mechanism 100 may not need to look at the grid 301 as the directional input 107 is being entered (but may instead feel the grid 301 through the protrusions 601). The protrusions 601 may also assist a user in finding an X zone and/or Y position corresponding to a number to be corrected. For example, the user may "feel" back 4 columns (using the protrusions 601) from the end of the entered number to correct the number placed in the $4^{th}$ column.

FIG. 7 illustrates a displayed input form 701 for receiving inputs from a number entry mechanism 100, according to an embodiment. In some embodiments, a user entering input into an input form (e.g., displayed as part of a computer application) may select an input field 703 (e.g., input field 703a or input field 703b) to enter data into by clicking on or tabbing to the input field 703. Other methods of selecting an input field 703 are also contemplated. In some embodiments, directional input 107 received through an motion sensitive input device 103 such as touchpad 207a or mouse 211 may move an on screen cursor until, for example, a double tap or double click is used to select an input field 703. Other selection methods are also contemplated (e.g., single click, etc.). When the input field 703 is selected, directional input 107 from the motion sensitive input device 103 may be used by the number entry mechanism 100 to determine one or more numerical inputs (e.g., according to grid 301 and, for example, bars 311 and 313).

In some embodiments, the type of input field 301 may determine the type and/or placement of the symbols 333 for the numerical input 323. For example, the entry of a number in a phone number input field 703a may result in the number entry mechanism 100 entering a dash (-) in between the third and fourth number (or, when a user presses bar 311 or 313, the number entry mechanism 100 may place a (-) if the input field is for a phone number). The symbol types and placements may be determined from pre-stored templates for one or more of the input fields (e.g., a template showing a dash between the third and fourth number for a phone number input field 703a). In some embodiments, the user may enter preferences for the symbols 333. For example, the user may indicate that a specified input field or range of input fields will have two decimal places. The number entry mechanism 100 may then place a decimal before the last two digits of a number entered into the specified input fields by the user. Other user pre-sets are also contemplated (e.g., phone number, currency, etc.).

The number entry mechanism 100 may be used in various applications. For example, the number entry mechanism 100 may be used to enter numbers into input fields for financial application programs such as tax software, budget software, payroll software, etc. As another example, the number entry mechanism 100 may be used in industrial applications (e.g., process monitoring software, etc.) and doctor's offices (e.g., in medical software used to input and manage patient health histories). Other applications are also contemplated.

Figure 8:
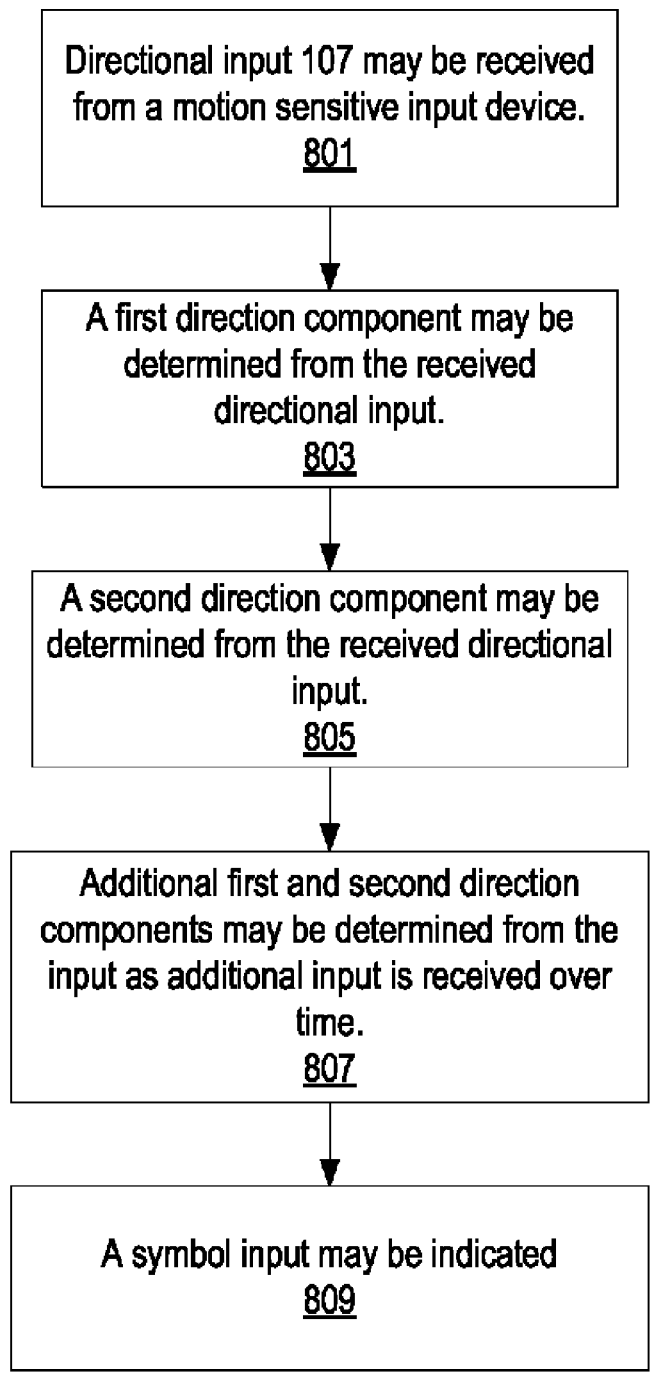
FIG. 8 illustrates a flowchart of a method of input using the number entry mechanism, according to an embodiment.

FIG. 8 illustrates a flowchart of a method of input using the number entry mechanism 100. It should be noted that in various embodiments of the methods described below, one or more of the elements described may be performed concurrently, in a different order than shown, or may be omitted entirely. Other additional elements may also be performed as desired.

At 801, directional input 107 may be received from a motion sensitive input device 103. The directional input 107 may include motion along two dimensions. For example, motion may be received from a touchpad 207*a*, touchscreen 221, mouse 211, etc. Other motion sensitive input devices 103 are also contemplated. For example, motion sensitive input devices 103 may receive input from the motion of various user body parts. For example, cameras may be used to monitor motion of a user's head or arm. In some embodiments, gloves may receive motion of a user's hand and/or fingers. Other motions are also contemplated. The motions may be analyzed for relative X/Y and/or Z directions and these motions may be correlated to number placements and magnitudes.

At 803, a first direction component may be determined from the received directional input 107. For example, the first direction component may correspond to motion along an X-axis direction 303. Intervals of the first direction component may correspond to placements of numbers in a numerical input 323 (e.g., 10's place, 100's place, etc.).

At 805, a second direction component may be determined from the received input. For example, the second direction component may correspond to motion in a Y-axis direction 305. Locations of the directional input 107 (e.g., line 307*a,b*) at one or more X intervals (e.g., see the marked x's in FIGS. 3*a,b*) may indicate a numerical value (e.g., 0-9) for the corresponding number placement.

At 807, additional first and second direction components may be determined from the directional input 107 as additional directional input 107 is received over time. For example, as the user moves a stylus or the user's finger 213 over a touchpad 207*a* or touchscreen 211, the corresponding line 307*a,b* may be analyzed for a series of first and second direction components. In some embodiments, the corresponding line may be displayed on a grid 301 to guide the user in inputting the user's desired number.

At 809, a symbol input 333 may be indicated. For example, the user may touch an X bar 311 or Y bar 313, may "draw" the symbol 333 on the touchpad/touchscreen, etc. In some embodiments, the number entry mechanism 100 may determine the symbol 333 using a template and/or user preferences (e.g., specified for an input field).

Figure 9:
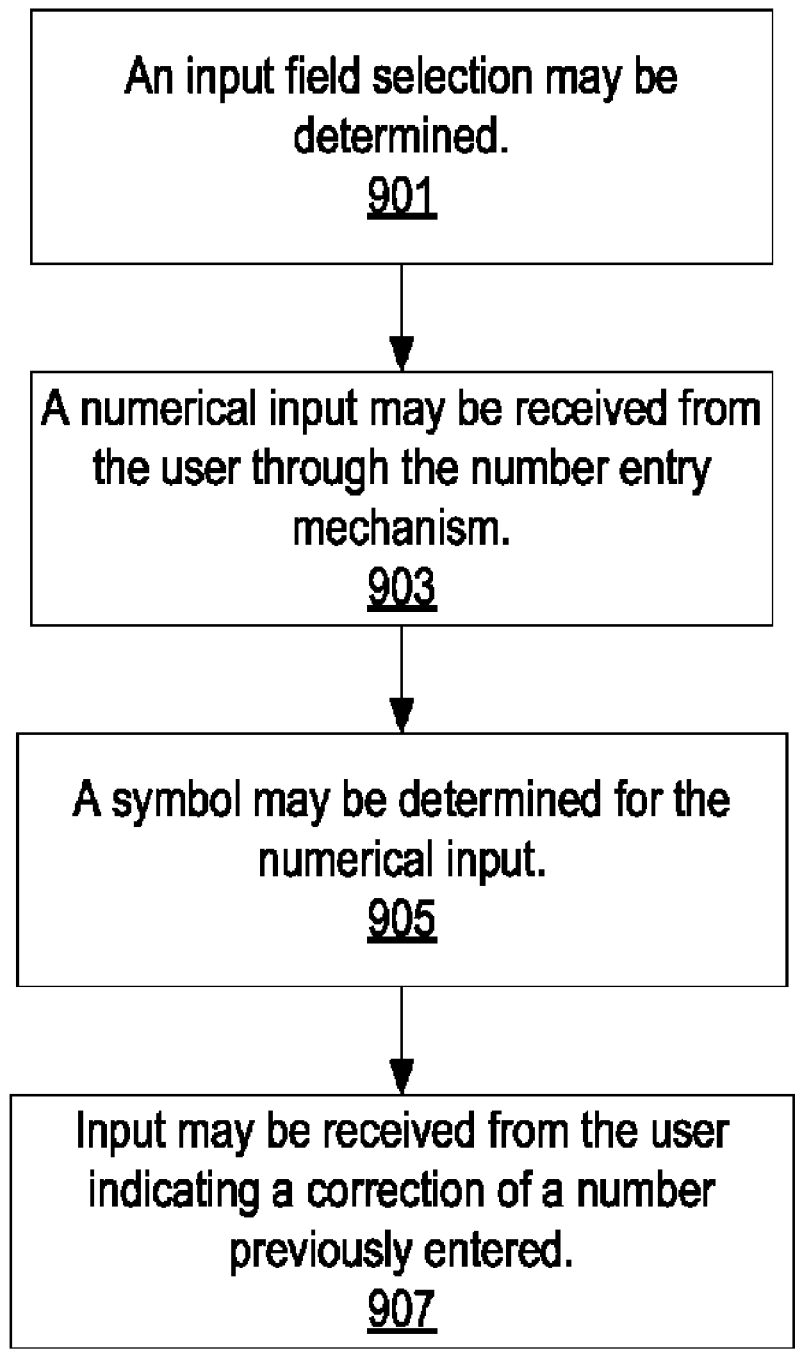
FIG. 9 illustrates a flowchart of a method for number entry into an application input field using the number entry mechanism, according to an embodiment.

FIG. 9 illustrates a flowchart of a method for number entry into an application input field 703 using the number entry mechanism 100. It should be noted that in various embodiments of the methods described below, one or more of the elements described may be performed concurrently, in a different order than shown, or may be omitted entirely. Other additional elements may also be performed as desired.

At 901, an input field selection may be determined. For example, a user may select the input field 703 by moving an on screen cursor over the input field 703 and clicking a mouse button or tapping a touchpad/touchscreen. In some embodiments, the user may press the tab key until the input field 703 is highlighted. Other input field selections are also contemplated.

At 903, a numerical input 323 may be received from the user through the number entry mechanism 100. For example, directional input 107 may be received and the X and Y direction components may be analyzed to determine a corresponding numerical input 323.

At 905, a symbol 333 may be determined. In some embodiments, the number entry mechanism 100 may determine the type and placement of the symbol 333 based on a template for the input field 703 (e.g., if the input field 703 is a phone number, the template may indicate placement of a dash between the third and fourth number entered by the user). In some embodiments, user input may be received indicating the type and/or placement of the symbol 333. For example, the user may tap the X bar 311 or Y bar 313. In some embodiments, the user may specify placement and/or type of symbol 333 for the input field 703 by providing template information to the application and/or number entry mechanism 100.

At 907, input may be received from the user indicating a correction of a number previously entered. For example, the user may tap a different location on the grid 301 on the touchpad 207*a* to indicate a different number magnitude for the corresponding number placement. Other correction indications are also contemplated.

Figure 10:
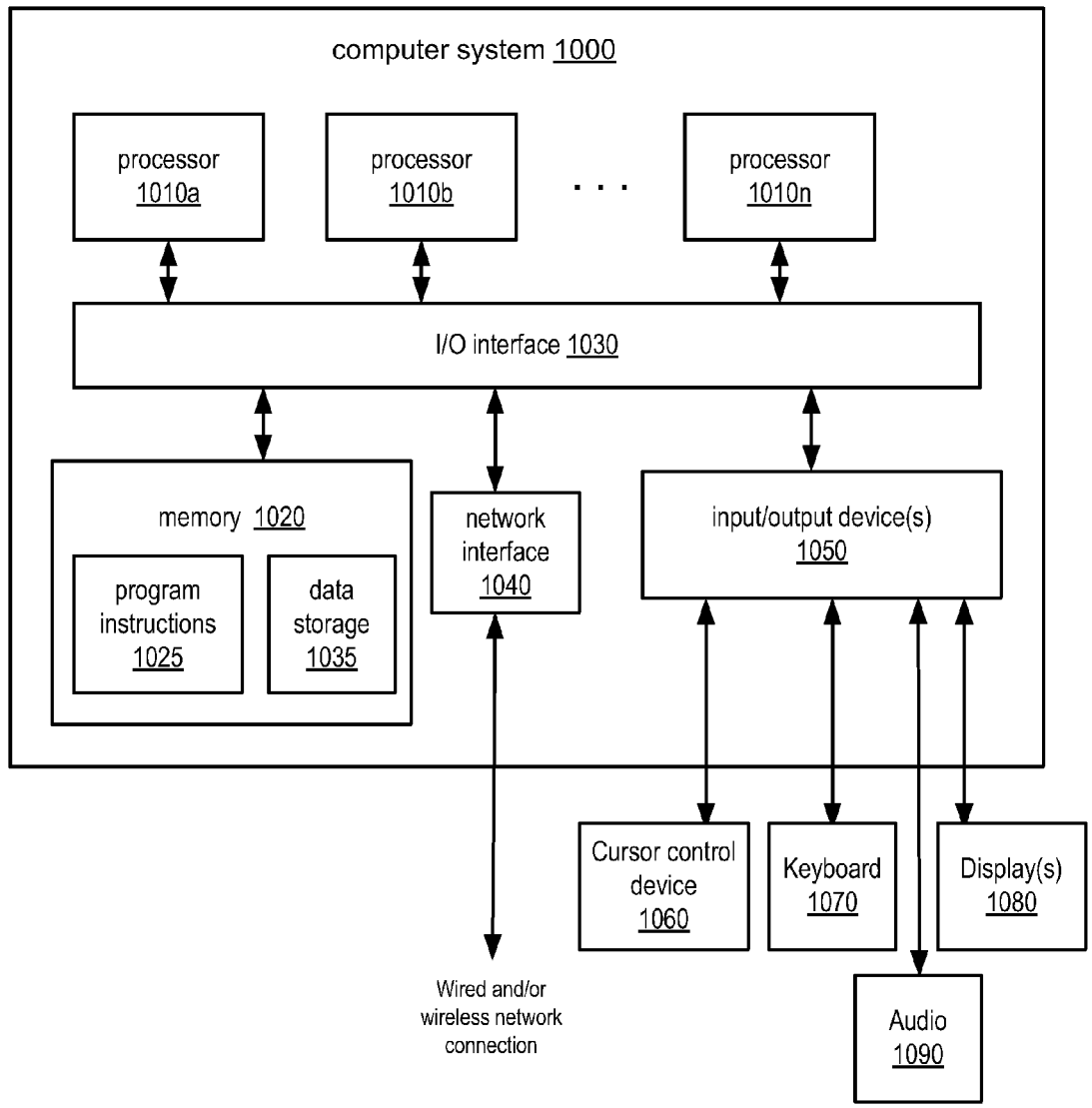
FIG. 10 illustrates an embodiment of a system for implementing the number entry mechanism.

Various components of embodiments of a number entry mechanism 100 as described herein may be executed on one or more computer systems, which may interact with various other devices. One such computer system is illustrated by FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, Scalable Processor Architecture (SPARC), or MIPS ISAs, or any other suitable ISA. In multiprocessor systems, each of processors 1010 may commonly, but not necessarily, implement the same ISA.

System memory 1020 may be configured to store program instructions and/or information accessible by processor 1010.

In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and information implementing desired functions, such as those described above for the number entry mechanism 100, are shown stored within system memory 1020 as program instructions 1025 and information storage 1035, respectively. In other embodiments, program instructions and/or information may be received, sent or stored upon different types of computer-accessible media or on similar media separate from system memory 1020 or computer system 1000. Generally speaking, a computer-accessible medium may include storage media or memory media such as magnetic or optical media, e.g., disk or Compact Disc/Digital Versatile Disc-Read Only Memory (CD/DVD-ROM) coupled to computer system 1000 via I/O interface 1030. Program instructions and information stored via a computer-accessible medium may be transmitted by transmission media or signals such as electrical, electromagnetic, or digital signals, which may be sent via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other information transformations to convert information signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow information to be exchanged between computer system 1000 and other devices attached to a network, such as other computer systems, or between nodes of computer system 1000. In various embodiments, network interface 1040 may support communication via wired or wireless general information networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving information by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement at least a portion of embodiments of the number entry mechanism 100 as described herein, and information storage 1035, comprising various documents, tables, databases, etc. accessible by program instructions 1025. In one embodiment, program instructions 1025 may include software elements of the number entry mechanism 100 illustrated in the Figures, and information storage 1035 may include information used in embodiments of the number entry mechanism 100. In other embodiments, different software elements and information may be included.

Those skilled in the art will appreciate that computer system 1000 is merely illustrative and is not intended to limit the scope of the number entry mechanism 100 as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and information integrity. Alternatively, in other embodiments some or all of the software components may execute in memory on another device and communicate with the illustrated computer system via inter-computer communication. Some or all of the system components or information structures may also be stored (e.g., as instructions or structured information) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, sent via a communication medium such as a network and/or a wireless link. Various embodiments may further include receiving, sending or storing instructions and/or information implemented in accordance with the foregoing description upon a computer-accessible medium. Accordingly, the present invention may be practiced with other computer system configurations.

Various embodiments may further include receiving, sending or storing instructions and/or information implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, Double Data Rate (DDR), RAMBUS Dynamic Random Access Memory (RDRAM), SRAM, etc.), ROM, etc. As well as transmission media or signals such as electrical, electromagnetic, or digital signals, sent via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An apparatus for populating input fields, comprising:
   a motion sensitive input device configured to:
      display a grid comprising a first X zone, a second X zone, an X placement line separating the first X zone and the second X zone, and a plurality of Y direction lines; and
      receive a first user motion crossing from the first X zone to the second X zone, wherein the first user motion crosses the X placement line at a location between a first Y direction line and a second Y direction line; and
   a memory medium, comprising program instructions, wherein the program instructions are computer-executable to:
      determine a first distance between the location on the X placement line and the first Y direction line;
      determine a second distance between the location on the X placement line and the second Y direction line; and
      populate, in response to the second distance exceeding the first distance, a first input field corresponding to the X placement line with a numerical value corresponding to the first Y direction line.

2. The apparatus of claim 1, wherein the motion sensitive input device comprises labels indicating numerical placement.

3. The apparatus of claim 1, wherein the motion sensitive input device comprises labels indicating numerical value.

4. The apparatus of claim 1, wherein the first user motion comprises a motion of a finger or stylus against the motion sensitive input device.

5. The apparatus of claim 1,
   wherein the motion sensitive input device is further operable to receive a second user motion, and
   wherein the program instructions are further computer-executable to populate a second input field with a non-numerical value based on the second user motion.

6. The apparatus of claim 5, wherein populating the second input field with the non-numerical value comprises determining one or more symbols automatically based on a type of the second input field.

7. The apparatus of claim 1, wherein the motion sensitive input device comprises at least one protrusion for use in displaying the grid.

8. A method for populating input fields, comprising:
   displaying a grid comprising a first X zone, a second X zone, an X placement line separating the first X zone and the second X zone, and a plurality of Y direction lines;
   identifying, through a motion sensitive input device, a first user motion crossing from the first X zone to the second X zone, wherein the first user motion crosses the X placement line at a location between a first Y direction line and a second Y direction line;
   determining a first distance between the location on the X placement line and the first Y direction line;
   determining a second distance between the location on the X placement line and the second Y direction line; and
   populating, in response to the second distance exceeding the first distance, a first input field corresponding to the X placement line with a numerical value corresponding to the first Y direction line.

9. The method of claim 8, wherein the first user motion comprises a motion of a finger or stylus against the motion sensitive input device.

10. The method of claim 8, further comprising:
    receiving a second user motion, and
    populating a second input field with a non-numerical value based on the second user motion.

11. The method of claim 10, wherein populating the second input field with the non-numerical value comprises determining one or more symbols automatically based on a type of second input field.

12. The method of claim 11, wherein the type of the second input field is a phone number and wherein populating the second input field with the non-numerical value automatically comprises determining the placement of a dash in the phone number.

13. The method of claim 8, wherein the motion sensitive input device comprises at least one protrusion for use in displaying the grid.

14. A non-transitory computer-readable storage medium comprising program instructions for populating input fields, wherein the program instructions are computer-executable to:
    display a grid comprising a first X zone, a second X zone, an X placement line separating the first X zone and the second X zone, and a plurality of Y direction lines;
    identify, through a motion sensitive input device, a first user motion from the first X zone to the second X zone, wherein the first motion crosses the X placement line at a location between a first Y direction line and second Y direction line;
    determine a first distance between the location on the X placement line and the first Y direction line;
    determine a second distance between the location on the X placement line and the second Y direction line;
    populate, in response to the second distance exceeding the first distance, a first input field position corresponding to the X placement line with a numerical value corresponding to the first Y direction line.

15. The non-transitory computer-readable storage medium of claim 14, wherein the first user motion comprises a motion of a finger or a stylus against the motion sensitive input device.

16. The non-transitory computer-readable storage medium of claim 14,
    wherein the program instructions are further executable to:
       receive a second user motion, and populate a second input field with a non-numerical value based on the second user motion.

17. The non-transitory computer-readable storage medium of claim 16, wherein populating the second input field with the non-numerical value further comprises determining one or more symbols automatically based on a type of the second input field.

18. The non-transitory computer-readable storage medium of claim 14, wherein the motion sensitive input device comprises at least one protrusion for use in displaying the grid.

\* \* \* \* \*